(12) United States Patent
Royster

(10) Patent No.: US 6,193,100 B1
(45) Date of Patent: Feb. 27, 2001

(54) TILTING CONTAINER SYSTEM WITH DAMPENING

(75) Inventor: Randy G. Royster, White House, TN (US)

(73) Assignee: Nashville Wire Products, Springfield, TN (US)

(*) Notice: Under 35 U.S.C. 154(b), the term of this patent shall be extended for 0 days.

(21) Appl. No.: 09/280,922

(22) Filed: Mar. 29, 1999

Related U.S. Application Data (63) Continuation-in-part of application No. 08/897,331, filed on Jul. 21, 1997.

(51) Int. Cl.[7] ............................................. B65D 90/00
(52) U.S. Cl. .................................... 220/694; 629/1.5
(58) Field of Search ....................... 220/694, 1.5, 628, 220/629

(56) References Cited

U.S. PATENT DOCUMENTS

| | | |
|---|---|---|
| 235,123 | 12/1880 | Bovey . |
| 1,924,824 | 8/1933 | Yeager . |
| 3,898,873 | 8/1975 | Glassmeyer .............................. 73/88 |
| 4,795,057 | 1/1989 | Jungels et al. ....................... 220/401 |
| 5,368,179 | 11/1994 | Bulle .................................... 220/1.5 |
| 5,806,863 | 9/1998 | Heger et al. ..................... 280/33.998 |

*Primary Examiner*—Steven Pollard
(74) *Attorney, Agent, or Firm*—Waddey & Patterson; Lucian Wayne Beavers (57) ABSTRACT

A tilting container apparatus includes a container and a leg pivotally mounted to the container for movement between a raised position and a lowered position. The leg supports the container in a tilted position when the leg is in the lowered position. A gas spring is connected between the container and the pivotal leg to dampen the movement of the pivotal leg as it moves downward from its raised position toward its lowered position. After the tiltable leg swings downward to a position approximately 90° to the horizontal base of the container, the gas spring functions to extend the movement of the tiltable leg toward its fully extended position and to hold the tiltable leg in its fully extended position.

20 Claims, 7 Drawing Sheets

TILTING CONTAINER SYSTEM WITH DAMPENING

The present application is a continuation-in-part of my U.S. patent application Ser. No. 08/897,331 filed Jul. 21, 1997, entitled "Tilting Container System".

BACKGROUND OF THE INVENTION

The present invention relates generally to containers used in the materials handling industry. More particularly, this invention pertains to a tilting container system which enables the user to access all the material in a container. This system is particularly applicable to larger containers.

It will be appreciated by those having ordinary skill in the art that it is difficult to access all the materials stored in the containers typically used in the materials handling industry. An example of such a container is a large wire mesh bin which can be used to store a variety of replacement parts, fasteners and other bulk products that are found in a manufacturing facility. To be more practical, such containers are also very large and therefore very difficult to tilt so that the user may reach materials at the bottom of the container.

To this end there have been a series of expensive tilting tables that have been developed. An example of such a tilting table is the E-Z Reach Container Tilter manufactured by Southwork. It is also necessary for the end user to purchase such a table in addition to purchasing the large storage containers.

What is needed, then, is a container system that enables the user to access all the material in the container but which is inexpensive and can be used as part of the container itself. Such a system is currently lacking in the prior art.

SUMMARY OF THE INVENTION

A tilting container apparatus includes a container and a leg pivotally mounted to the container for movement between a raised position and a lowered position. The leg supports the container in a tilted orientation when the leg is in a lowered position. A dampening controller is connected between the container and the leg, for dampening pivotal movement of the leg between its raised and lowered positions.

The dampening controller is preferably a gas spring which also functions to urge the leg past a 90° angle relative to the base of the container and to hold the leg in a fully extended position at more than 90° relative to the base of the container.

Methods of tilting a container using the apparatus just described are also disclosed.

Accordingly, it is an object of this invention to provide a tilting container system.

It is a further object of this invention to provide a tilting container system that includes a pivoting leg which enables the container to be supported when it is in a tilted position.

It is a further object of this invention to provide a tilting container that is self-supported.

It is still a further object of this invention to provide a tilting container which allows ergonomic access to all parts or other materials contained inside the container.

It is still a further object of this invention to provide a tilting container system that can be tilted and maintained in a tilted position without having to use a separate piece of equipment such as a tilting table.

It is yet another object of this invention to provide a portable, stable and self-contained tilting container system.

It is still a further object of this invention to provide a tilting container system which allows for a complete access to the parts or other materials stored within the container.

Still another object of the present invention is the provision of a tilting container system which includes a damping controller for dampening pivotal movement of a leg between its raised and lowered positions.

And another object of the present invention is the provision of a tilting container system which includes a means for holding a tilting leg in its lowered position.

Other objects of this invention will be apparent from the foregoing detailed description.

DESCRIPTION OF THE PREFERRED EMBODIMENTS

Referring now to the drawings, wherein like reference numerals refer to like parts throughout, the system of this invention is referred to generally at 10. References are made in the detailed description to right and left; bottom and top; interior and exterior; and front and rear. Such references are made for clarity of the written description, and should not be construed as limitations on the scope of this invention.

Figure 1:
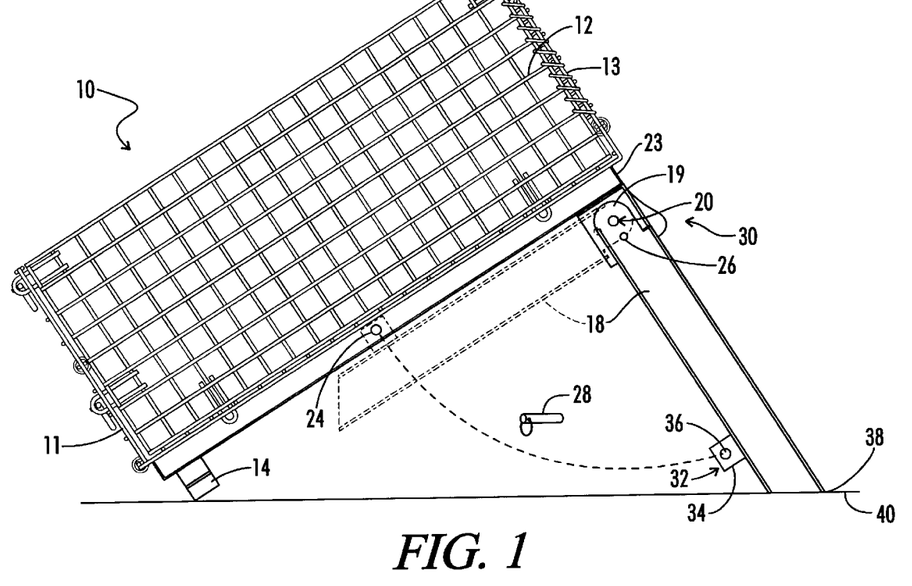
FIG. 1 is a side view of the tilting container system of this invention wherein the container is tilted and the pivoting support leg is in a lowered position.
Figure 4:
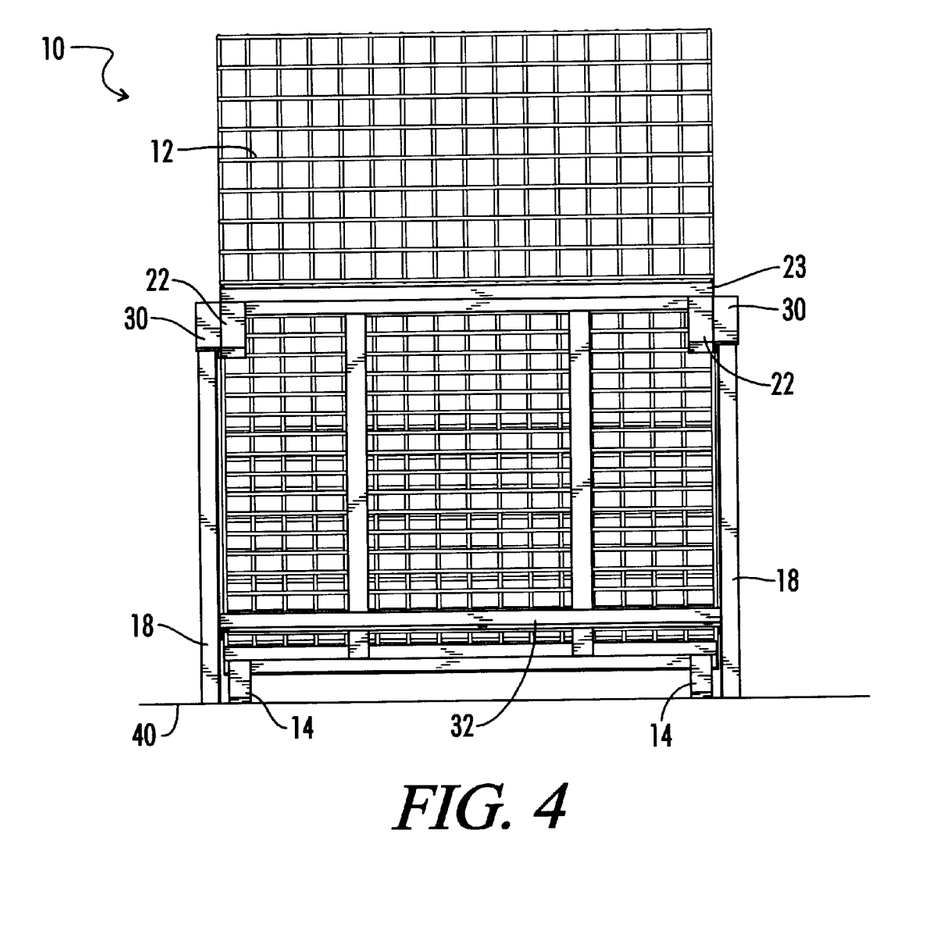
FIG. 4 is a back view of the system of this invention.

Referring now to FIGS. 1 and 4, system 10 comprises container 12 and pivotally mounted support leg 18. A leg mount 22 is welded to the base 23 of container 12 adjacent to the rear end 13 of container 12. Heavy angle 30 is then welded to the exterior surface of leg mount 22.

Figure 2:
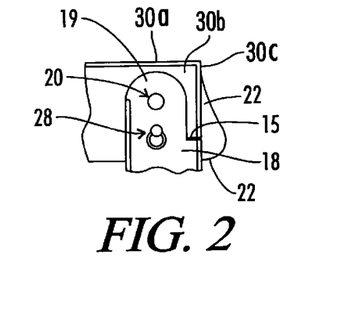
FIG. 2 is a close-up side view of the connection between the support leg and container of the system of this invention.
Figure 3:
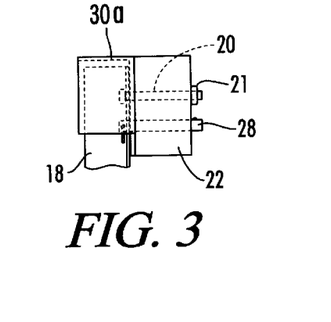
FIG. 3 is a close-up back view of the connection between the support leg and container of the system of this invention.

As best seen in FIGS. 1–3, heavy angle 30 includes three sides, top side 30a, interior side 30b and rear side 30c. Support leg 18 is pivotally mounted to leg mount 22 and heavy angle 30 via swivel pivot pin 20. Swivel pivot pin 20 passes through support leg 18 through interior side 30b of heavy angle 30 and through leg mount 22. Swivel pivot pin 20 preferably also comprises a nut 21 (FIG. 3). The pivoting of leg 18 is facilitated by notch 15 formed in the side edge of leg 18. Notch 15 fits with heavy angle 30 when the leg 18 is in a lowered position. Additionally, end 19 of leg 18 is rounded to facilitate movement within heavy angle 30. Leg 18 is also preferably standard channeled steel and thus is "I" shaped in cross-section.

Figure 1A:
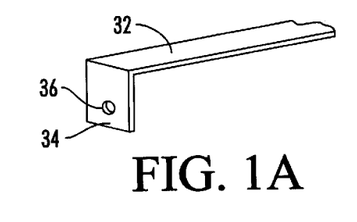
FIG. 1A is a perspective view of the flat brace 32 that is mounted between the support legs in an embodiment of the system of this invention.

Continuing on FIGS. 1, 1A and 4, leg 18 is therefore pivotally mounted via swivel pivot pin 20. In the raised position, shown in phantom in FIG. 1, the leg 18 is secured to the base 23 of container 12 via the interaction of pin 28 through bore 36 and into bore 24. Bore 24 is formed into base 23 of container 12. Bore 36 is formed into flange 34 of flat brace 32, as can be best seen in FIG. 1A. As seen in FIG. 4, brace 32 is mounted between pivoting support legs 18 of system 10.

Referring back to FIGS. 1–3, pin 28 secures leg 18 in the lowered position when it is mounted into bore 26. As best seen in FIGS. 2 and 3, bore 26 is formed through leg 18 and through interior side 30b of heavy angle 30 and through leg mount 22. Heavy angle 30 is welded to base 23 of container 12 along its top side 30a. Heavy angle 30 is welded to leg mount 22 along its back side 30b.

Continuing on FIG. 1, system 10 also includes a front leg 14 to further support container 12 when system 10 is tilted as shown in FIG. 1. As is apparent in FIG. 1, front legs 14 are fixed non-pivoted legs, and are shorter than the pivoted legs 18. Thus, in FIG. 1, when system 10 is in a tilted position, the leg 18 is in a lowered position. End 38 of leg 18 is cut off at an angle to rest flush against floor 40, thus providing stability to system 10. The user can then access all materials within container 12 as the materials proceed toward the front end 11 of the container 12.

Figure 5A:
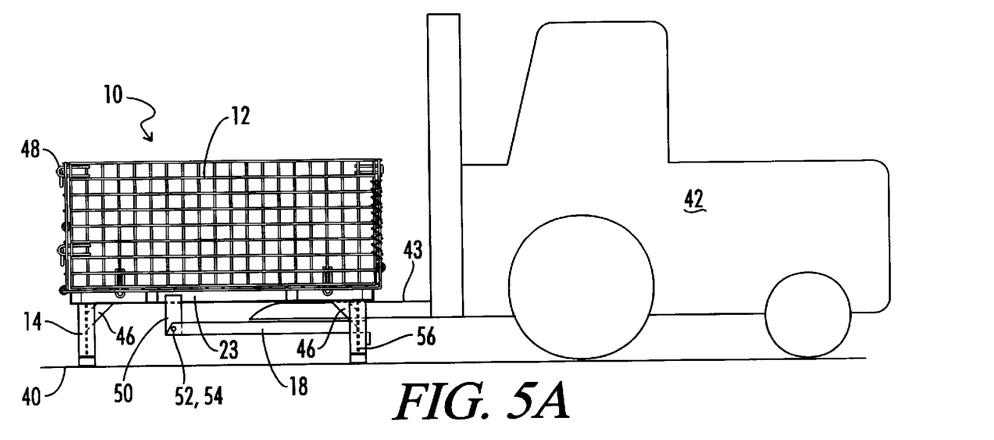
FIG. 5A is a side view of the system of this invention cooperatively interacting with a lift truck but before the system is raised to a tilted position.
Figure 5B:
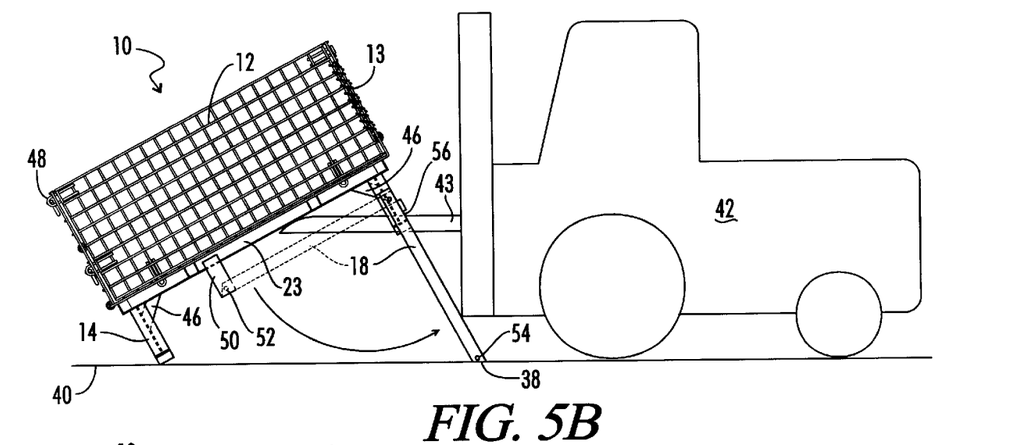
FIG. 5B is a side view of the system of this invention in cooperative interaction with a lift truck where the system is raised to a tilted position and the support leg is placed in a lowered position.
Figure 5C:
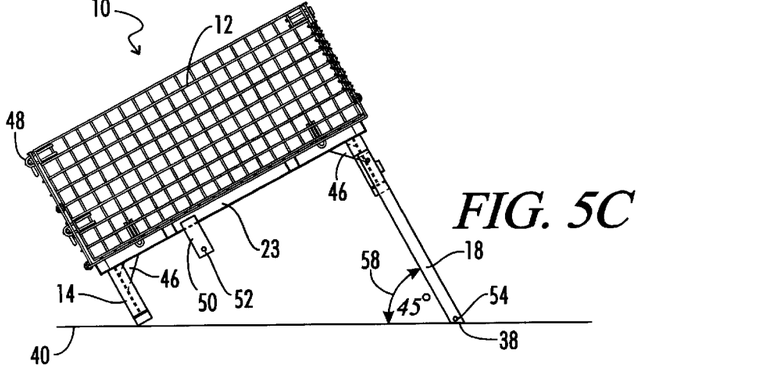
FIG. 5C is a side view of the system of this invention in a tilted position with the support leg of this invention in a lowered position after the lift truck has been removed.

Referring now to FIG. 5A, 5B and 5C, the mode of operation of the system 10 of the present invention is further described. A lift truck is maneuvered such that tines 43 of lift truck 42 are positioned beneath base 23 of the container 12 of system 10. The embodiment depicted in FIGS. 5A–5C further includes rear leg 56. The support leg 18 of FIGS. 5A–5C may also be referred to as a leg extender 18 or an extendable support member 18. Support leg 18 is mounted to rear leg 56 in an identical fashion as it is mounted to leg mount 22 as described above, except that support leg 18 is pivotally mounted behind rear leg 56. The system also includes braces 46 mounted between base 23 and legs 14 and 56. Finally, the system also includes a door 48 which the user opens to access materials within container 12.

Continuing on FIGS. 5A, leg 18 is secured in the raised position by placing a pin 28 through bore 54 and through bore 52 that is formed in mounting stud 50. Thus, in the embodiment depicted in FIGS. 5A–5C, leg 18 is secured in a raised position to mounting stud 50 as opposed to directly to base 23. Stud 50 is welded to base 23.

Referring particularly to FIG. 5B, in continuing to describe the operation of the system in this invention, tines 43 of lift truck 42 are moved to a raised position to tilt container 12 forward. Leg 18 is then pivoted at swivel pivot 20 and placed against floor 40. The foot 38 of leg 18 is cut off at an angle to provide for flush contact with floor 40. This enhances the stability of system 10.

Continuing to FIG. 5C, the fork lift 42 is then removed and the user can then open door 48 to access materials within container 12. In the lowered position of FIG. 5C, leg 18 provides stable support for container 12 in the tilted position so that the user can easily access materials within container 12. Thus, the angle of foot 38 and leg 18 is selected to provide the most suitable stability. A suitable example for the angle between the floor 40 and the leg 18 as provided by the angled end 38 is 45°. This is referred to at 58 in FIG. 5C.

The apparatus of FIGS. 5A–5C and the methods of using the same may be generally summarized as follows.

The container 12 has a front end 11 adjacent the front legs 14 and a rear end 13 adjacent the rear legs 56. The rear and front ends may also be referred to as first and second ends of the container 12.

The rear and front legs 56 and 14 may be described as first and second pairs of fixed legs 56 and 14 extending downward from the first and second ends, respectively, of the container 12 for supporting the container 12 in a level orientation when the first and second pairs of fixed legs 56 and 14 engage a ground surface as shown in FIG. 5A.

The pivotable members 18 may be described as a pair of leg extenders 18 operably associated with the first or rear pair of legs 56 so that the leg extenders 18 can support the container 12 in a tilted orientation as shown in FIG. 5C.

As shown in the figures of the preferred embodiment, it is preferred that container 12 comprise a wire mesh container as such containers are most commonly used in material handling industries. However, other containers are contemplated to be within the scope of this invention.

Figure 6:
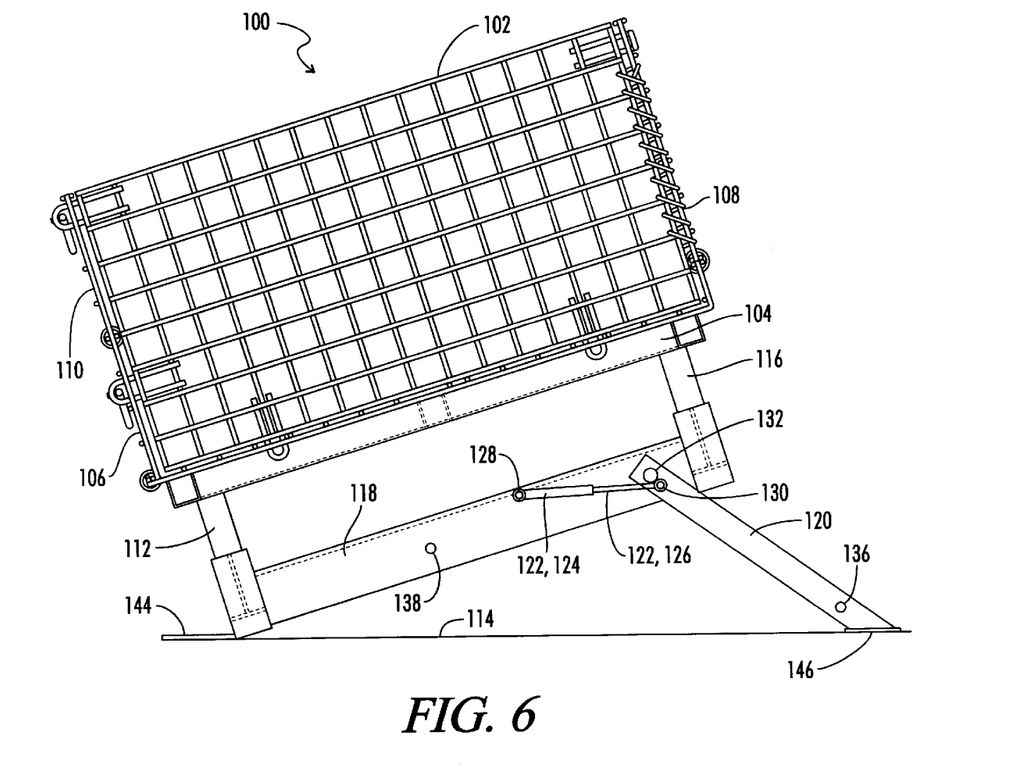
FIG. 6 is a side elevation view of an alternative embodiment of the invention including a gas spring connected to the tiltable leg. The embodiment of FIG. 6 is shown in its tilted orientation.
Figure 7A:
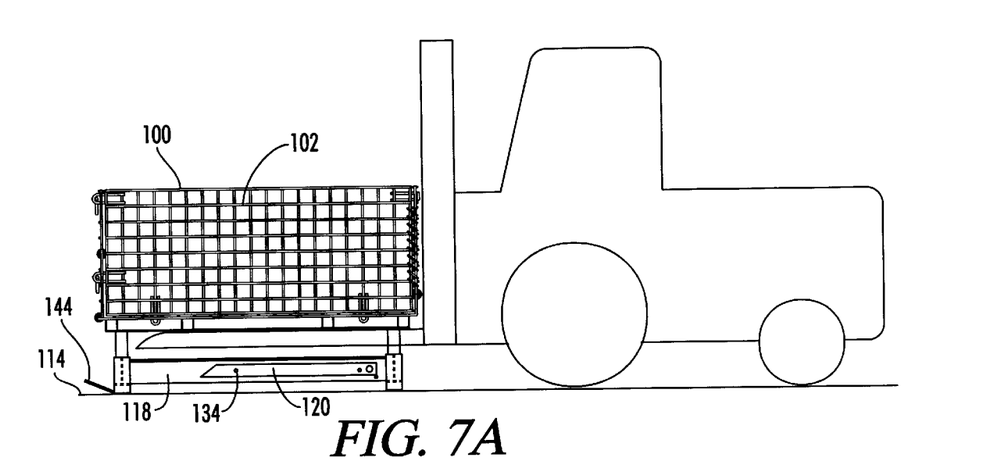
FIG. 7A is a view of the apparatus of FIG. 6 in its initial horizontal orientation with the tiltable leg pinned in a retracted position. The apparatus has been engaged by a fork lift truck just prior to lifting the apparatus.
Figure 7B:
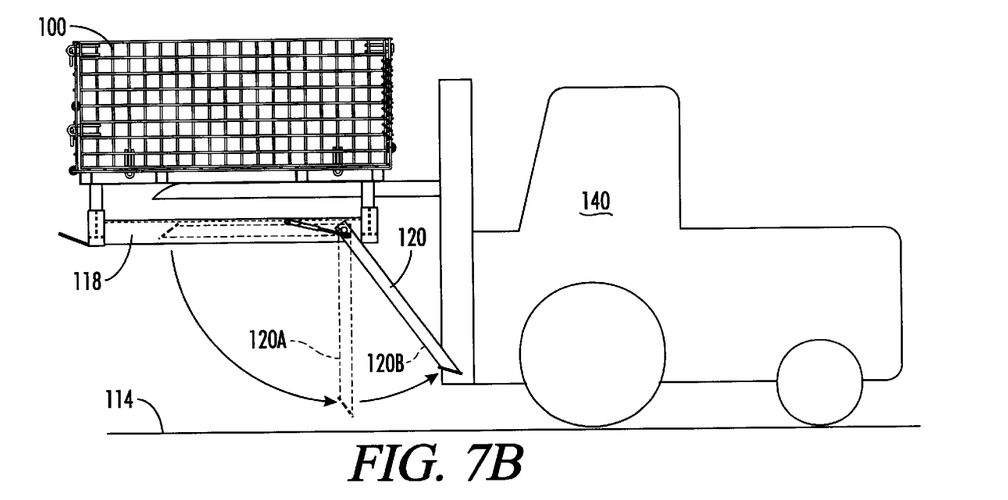
FIG. 7B shows the fork lift truck having lifted the apparatus of FIG. 7A, and illustrates the positions of the tilting leg as it swings downward from its retracted position to its fully extended position.
Figure 7C:
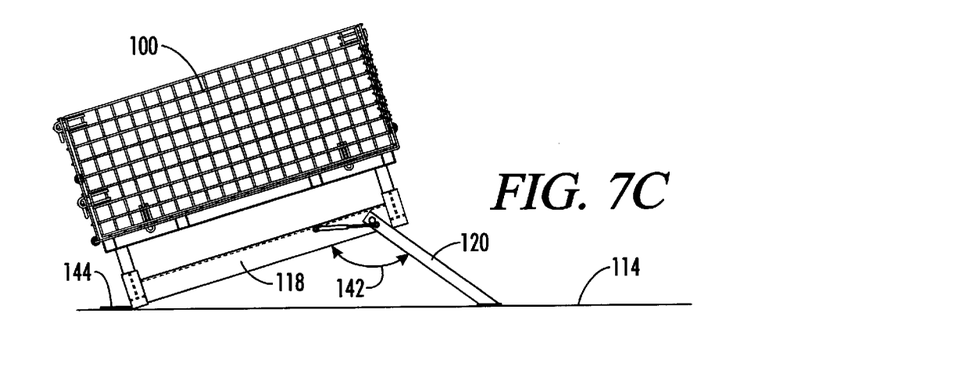
FIG. 7C shows the apparatus of FIGS. 7A and 7B having been lowered down onto the ground surface and resting in its tilted orientation with its is tilting leg fully extended.
Figure 8A:
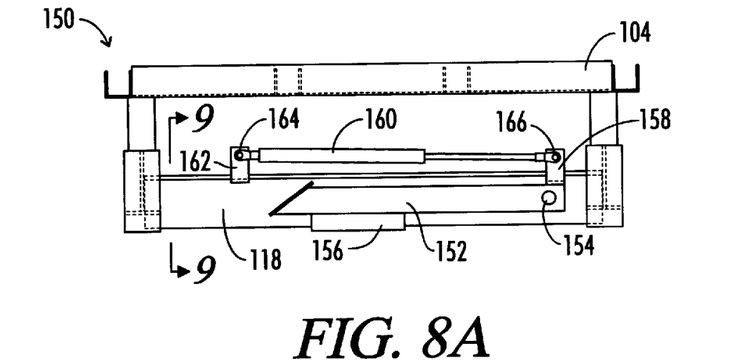
FIG. 8A is an illustration of an elevation partially sectioned view looking from underneath the base framework to the side showing an alternative mounting arrangement for the tiltable leg and gas spring.
Figure 8B:
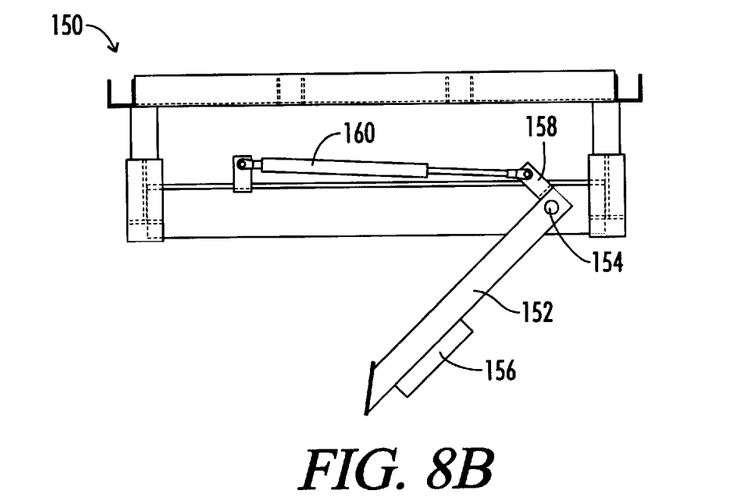
FIG. 8B shows the apparatus of FIG. 8A in a partially lowered position.
Figure 8C:
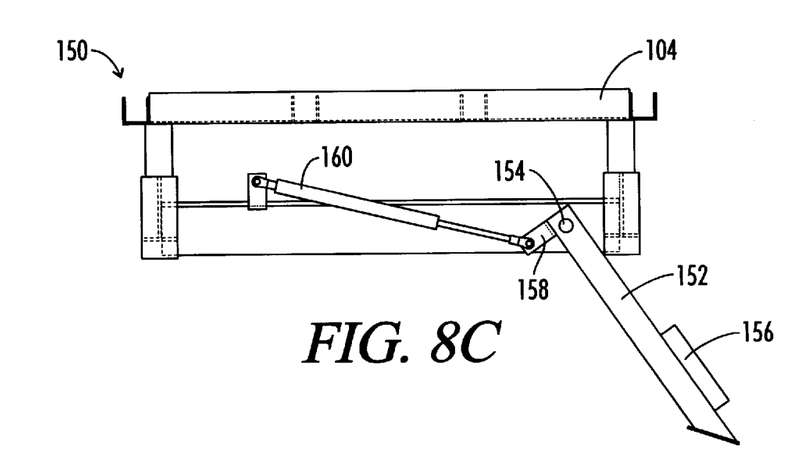
FIG. 8C shows the apparatus of FIG. 5A in a fully lowered position.

THE EMBODIMENTS OF FIGS. 6–8

Another alternative embodiment is shown in FIGS. 6 and 7A–7C. The tilting container apparatus of FIG. 6 is generally designated by the numeral 100. The apparatus 100 includes a wire mesh container 102 supported on a base framework 104. Container 102 has a front end 106 and a rear end 108. The front end 106 includes a door 110.

The container 102 and its base framework 104 are generally rectangular in shape, and the apparatus 100 includes a pair of rigid front legs 112 extending downward from the base framework 104 into engagement with the ground surface 114. Apparatus 100 further includes a pair of rigid rear legs 116. The front and rear legs 112 and 116 are joined by lengthwise braces 118. Legs 112 and 116 and braces 118 may be considered to be a part of the base framework 104.

The apparatus 100 includes a pair of tilting legs 120 on opposite sides of the base framework 104. Only one of the tilting legs 120 is visible in FIGS. 6 and 7A–7C. The tilting leg 120 is pivotally mounted to the brace 118 of container 102 for movement between a raised position as shown in FIG. 7A and a lowered position as shown in FIGS. 6 and 7C. The tilting leg 120 may also be referred to as an extendable support member 120.

A gas spring 122 is connected between the brace 118 of container apparatus 100 and the tilting leg 120. The gas spring 122 includes a cylinder portion 124 and a piston portion 126. The cylinder portion 124 is pinned to brace 118 at pin 128. The piston portion 126 is pinned to tilting leg 120 at pin 130.

The tilting leg 120 is pivotally connected to brace 118 at pin 132.

The gas spring 122 is of the type that provides a resilient outward force on the piston 126, yet will resist rapid pulling of the piston 126 outward from cylinder 122.

Thus, the gas spring 122 will work as follows with reference to the sequential figures of 7A–7B.

In FIG. 7A, the tilting leg 120 is pinned in its raised position by a removable pin 134 which is received through a pin bore 136 in tilting leg 120 and a pin bore 138 in brace 118.

As seen in FIG. 7A, when the tilting leg 120 is pinned in its raised position, it does not contact the ground surface 114 in any way. The container apparatus 100 rests upon the lower ends of its front and rear legs 112 and 116 with the container 102 in a level orientation.

To change the orientation of the container apparatus 100 to its tilted position of FIG. 7C, the apparatus 100 is first lifted with a fork lift truck 140 as shown in FIG. 7B. The pin 134 is removed to allow the tilting leg 120 to swing downward through an intermediate position such as 120A to a final position such as 120B shown in FIG. 7B.

When the pin 134 is first removed, the weight of the tilting leg 120 will cause it to drop rather rapidly pivoting downward about pivot pin 132. This downward pivoting motion will, however, be resisted by the dampening effect provided by the movement of the piston 126 within the cylinder 124 of gas spring 122. Thus the gas spring 122 may in one aspect be described as a dampening controller 122 connected between the container apparatus 100 and the tilting leg 120 for dampening pivotal movement of the tilting leg 120 between its raised and lowered positions.

Furthermore, it will be apparent in viewing FIG. 7B, that as the tilting leg 120 swings downward it eventually reaches a substantially vertical position where it is at an angle of approximately 90° to the horizontal and to the brace 118 of the container 100. At this position the forces of gravity no longer move the tilting leg 120, but the resilient outward biasing force of the gas spring 122 will continue to urge tilting leg 120 past the vertical position to its rearward most extended position as indicated by 120B. Then, the apparatus 100 is lowered back to the ground surface 114 by the lift truck 140 and is allowed to rest upon the ground 114 in its tilted orientation as shown in FIG. 7C.

Thus, the gas spring 122 may be further described as including a means for holding the tilting leg 120 in its lowered or most extended position 120B. When the tilting leg 120 is in its most extended position it forms an obtuse angle 142 relative to its raised position of FIG. 7A and relative to the horizontal brace 118 of the container apparatus 100. In the embodiment illustrated the obtuse angle 142 is approximately 128°.

It is noted that a stability plate 144 is attached to the forward legs 112 at an angle such that when the container apparatus 100 is in its tilted orientation as shown in FIG. 7C, the stability plate 144 will be substantially horizontally oriented and will rest upon the floor 114.

It is also noted, that the tilting leg 120 has a lower end 146 which is formed at an angle such that when the apparatus 100 rests in its tilted position, the lower end 146 of tiltable leg 120 will flatly engage the ground surface 114, again to add stability to the tilted orientation of the apparatus 100.

THE EMBODIMENT OF FIGS. 8A–8C

FIGS. 8A–8C illustrate a further modified arrangement of the base framework 104 with a modified gas spring. The apparatus shown in FIGS. 8A–8C is generally designated by the numeral 150. It will be understood that although the apparatus 150 shows only the base framework 104, it also includes a wire mesh basket such as the basket 102 shown in FIGS. 6 and 7A–7C.

FIGS. 8A–8C are each partially sectioned elevation views looking from a position under the central portion of the apparatus 150 out toward one side, and thus these views show a view of the leg 152 which is somewhat hidden from external view.

In the embodiment of FIGS. 8A–8C, a tilting leg 152 is pinned to the cross brace 118 at pivot point 154. A kick plate 156 is attached to tilting leg 152 and is constructed to be engaged by the human foot to push the tilting leg 152 downward toward its extended position of FIG. 8C. A similar tilting leg (not shown) is attached to the opposite side of framework 104, and the two tilting legs are connected by a cross brace so that the legs move as one piece.

A mounting bracket 158 extends upward from the rear end of tilting leg 152.

When the tilting leg 152 is in its retracted position as shown in FIG. 8A the mounting bracket 158 extends upward above the cross brace 118. A gas spring 160 has its cylinder end connected at pivot point 164 to a bracket 162 attached to cross brace 118. The piston end of gas spring 160 is connected at pivot 166 to the bracket 158.

Thus, when the tilting leg 152 is in its raised position as shown in FIG. 8A, the gas spring 160 lies in a substantially horizontal orientation located just above the elevation of the cross brace 118.

The outward resilient force of the gas spring 160 will tend to hold the tilting leg 152 in its raised position as shown in FIG. 8A.

To move the tilting leg 152 downward, a human operator will engage the foot plate 156 and push downward on it, thus causing the tilting leg 152 to begin to rotate counterclockwise about pivot 154 through the position shown in FIG. 8B toward the position shown in FIG. 8C.

As the tilting leg 152 begins to rotate from its initial position of FIG. 8A, it will compress the piston portion of the gas spring 160 into the cylinder thereof, and the gas spring 160 will resist that motion. This will continue to be the case, until the bracket 158 pivots past a position substantially aligned with the length of the gas spring 160 after which the outward resilient force of the gas spring 160 will tend to reinforce the counterclockwise rotation of tilting leg 152. Thus the gas spring 160 will, in the final stages of rotation ,help to move the tilting leg 152 past a vertical position toward and to its fully extended position as shown in FIG. 8C.

After the tilting leg 152 is moved to its fully extended position as shown in FIG. 8C, the apparatus 150 will be lowered to engagement with the ground floor in a manner analogous to that shown in FIG. 7C and the base framework 104 and the container attached thereto will rest upon the floor in a tilted position analogous to that shown in FIG. 7C.

Figure 9:
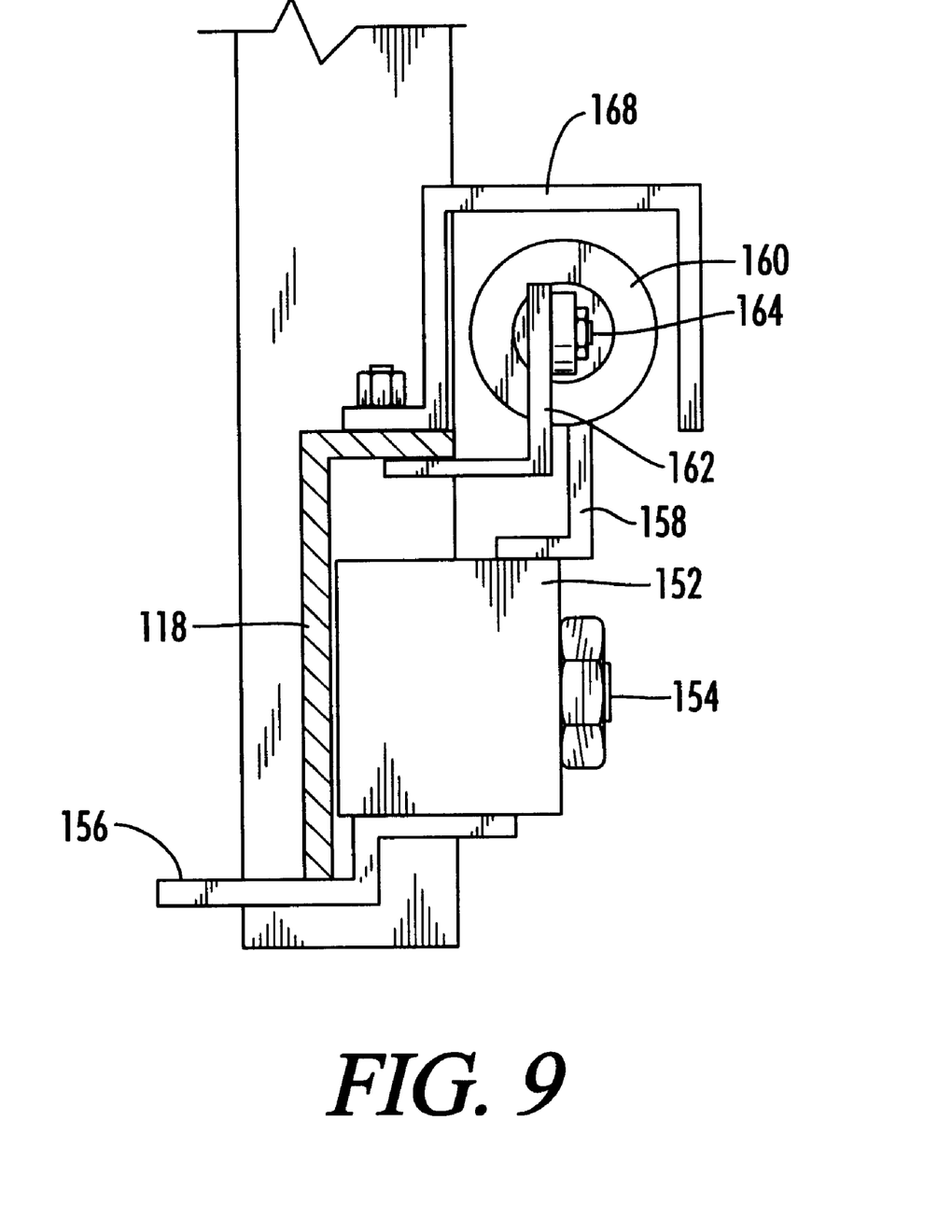
FIG. 9 is a schematic sectioned elevation view taken along line 9—9 of FIG. 8A to further illustrate the manner in which the tiltable leg is mounted and to illustrate an optional detachable protective cover over the gas spring.

FIG. 9 is a somewhat schematic sectioned view taken along line 9—9 of FIG. 8A and it shows an additional optional feature.

Preferably, a detachable cover 168 is supported from cross brace 118 to cover the gas cylinder 160 to help protect it from damage by possible engagement with the fork lift tines of the fork life truck.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A tilting container apparatus comprising:

a container;

a leg pivotally mounted to the container for movement between a raised position and a lowered position, the leg supporting the container in a tilted position when the leg is in the lowered position;

a dampening controller connected between the container and the leg, for dampening pivotal movement of the leg between its raised and lowered positions; and a kick plate attached to the leg, and extending laterally outward from the leg away from the container so that a human can move the leg between its raised and lowered positions by engaging the kick plate with a human foot.

2. The apparatus of claim 1, wherein:

the dampening controller also includes a means for holding the leg in its lowered position.

3. The apparatus of claim 2, wherein the means for holding the leg in its lowered position comprises a means for holding the leg at a greater than 90° angle from its raised position.

4. The apparatus of claim 1, wherein:

the dampening controller comprises a gas spring.

5. The apparatus of claim 1, further comprising:

a removable protective shield covering the dampening controller to prevent damage to the dampening controller from a fork lift lifting the container.

6. A tiltable container apparatus, comprising:

a container having first and second ends;

a pair of legs pivotally attached to the first end of the container;

a resilient retaining device connected between the container and at least one of the legs, for resiliently holding the legs in an extended position in which the legs support the container in a tilted orientation; and a protective shield covering the resilient retaining device.

7. The apparatus of claim 6, wherein:

the resilient retaining device also comprises a means for dampening pivotal movement of the legs from their retracted position to their extended position.

8. The apparatus of claim 6, wherein:

the container includes a base; and the legs are extended at an angle of greater than 90° from the base of the container when the legs are in their extended position.

9. The apparatus of claim 6, wherein:

the resilient retaining device comprises a gas spring.

10. The apparatus of claim 6, further comprising:

a kick plate attached to at least one of the legs.

11. A tiltable container apparatus, comprising:

a container;

a base for supporting the container in a level oreitnation from a ground surface, the base having a first end and a second end, and the base having a length from the first end fot he second end; and a pivotable support leg, having a length greater than one half the length of the base, the leg being pivotally attached to the base and pivotable between a retracted position wherein the base supports the container in a level orientation, and an extended position wherein the first end of the base is held above the ground surface so that the base and container are tilted, the support leg forming an obtuse angle with the base when the support leg is in its extended position.

12. The apparatus of claim 11, further comprising:

a gas spring connected between the base and the support leg.

13. The apparatus of claim 12, wherein:

the gas spring comprises a means for dampening movement of the pivotable support leg to its extended position.

14. The apparatus of claim 12, wherein:

the gas spring comprises a means for pushing the pivotable support leg past a 90° angle with the base to the obtuse angle.

15. The apparatus of claim 12, further comprising:

a shield surrounding the gas spring.

16. The apparatus of claim 11, further comprising:

a kick plate attached to the pivotable support leg.

17. A method of tilting a container to provide better access to an interior of the container, said method comprising the steps of:

(a) providing a container having an extendable support member at one end thereof;

(b) initially retaining the support member in a retracted position so that the container rests in a level orientation on a ground surface;

(c) lifting the container off of the ground surface;

(d) pushing on a kick plate attached to the support member and thereby extending the support member;

(e) during step (d), dampening movement of the support member; and (f) lowering the container back onto the ground surface so that the support member holds the one end of the container higher than the other end and the container is support in a tilted orientation.

18. The method of claim 17, wherein:

step (d) further comprises, pushing the support member past a 90° angle relative to a base of the container to a fully extended position wherein the support member forms an obtuse angle with the base of the container.

19. The method of claim 18, wherein the pushing step is accomplished with a gas spring.

20. The method of claim 17, wherein step (e) is further characterized as dampening the movement of the support member with a gas spring.

* * * * *

UNITED STATES PATENT AND TRADEMARK OFFICE
CERTIFICATE OF CORRECTION

PATENT NO. : 6,193,100 B1
DATED : February 27, 2001
INVENTOR(S) : Royster

It is certified that error appears in the above-identified patent and that said Letters Patent is hereby corrected as shown below:

Column 2,
Line 57, change "FIG. 3A" to -- FIG. 8A --.

Column 8,
Line 9, change "fot he" to -- to the --.

Signed and Sealed this

Twenty-ninth Day of January, 2002

Attest:

JAMES E. ROGAN
Attesting Officer
Director of the United States Patent and Trademark Office